US009999108B2

(12) United States Patent
Rezeanu et al.

(10) Patent No.: US 9,999,108 B2
(45) Date of Patent: Jun. 12, 2018

(54) EMERGENCY LIGHTING DRIVER WITH PROGRAMMABLE OUTPUT POWER

(71) Applicant: PHILIPS LIGHTING HOLDING B.V., Eindhoven (NL)

(72) Inventors: Stefan-Cristian Rezeanu, Eindhoven (NL); David Blake Crenshaw, Eindhoven (NL); Abhishek Chandrashekhar Sabnis, Eindhoven (NL); Shawn Croley, Eindhoven (NL); Brian Inman, Eindhoven (NL); Tawatos Phadungsoondararak, Eindhoven (NL); Madan Venn, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/311,174

(22) PCT Filed: Apr. 28, 2015

(86) PCT No.: PCT/IB2015/053072
§ 371 (c)(1),
(2) Date: Nov. 14, 2016

(87) PCT Pub. No.: WO2015/173680
PCT Pub. Date: Nov. 19, 2015

(65) Prior Publication Data
US 2017/0079111 A1 Mar. 16, 2017

Related U.S. Application Data

(60) Provisional application No. 61/992,961, filed on May 14, 2014.

(51) Int. Cl.
*H05B 37/02* (2006.01)
*H05B 33/08* (2006.01)

(52) U.S. Cl.
CPC ..... *H05B 33/0884* (2013.01); *H05B 33/0845* (2013.01); *H05B 37/0227* (2013.01); *H05B 37/0272* (2013.01)

(58) Field of Classification Search
CPC ............ H05B 33/0845; H05B 33/0884; H05B 37/0227
(Continued)

(56) References Cited

U.S. PATENT DOCUMENTS 3,041,501 A   6/1962   Willits
4,799,039 A   1/1989   Balcom et al.
(Continued)

FOREIGN PATENT DOCUMENTS

CA   2762869 A1   6/2013
EP   0949741 a2   10/1999
(Continued)

OTHER PUBLICATIONS

Philips, Lightguard, "Smart Charger for Unit Equipment," Last Accessed on Nov. 2015 (2 Pages).

*Primary Examiner* — Douglas W Owens
*Assistant Examiner* — Amy Yang
(74) *Attorney, Agent, or Firm* — Akarsh P. Belagodu

(57) ABSTRACT

An emergency lighting driver (100, 200, 400) includes: a power translation circuit (120, 220, 421/423/425) which receives input power from an emergency power source (10) and supplies output power to a load (20); and a programmable control device (140, 240) which controls the power translation circuit in response to a voltage feedback signal and a current feedback signal to cause the output power supplied to the load to have a programmed power output profile (302, 304), wherein the programmed power output profile is a function of time, temperature, the type of energy source employed for the emergency power source, the
(Continued)

amount of remaining energy stored in the emergency power source, and/or the occupancy of an area in which the emergency lighting driver is located.

13 Claims, 5 Drawing Sheets

(58) Field of Classification Search
USPC .............. 315/291–294, 129–131, 152–153
See application file for complete search history.

(56) References Cited

U.S. PATENT DOCUMENTS

| | | | |
|---|---|---|---|
| 4,945,280 | A | 7/1990 | Beghelli |
| 4,988,889 | A | 1/1991 | Oughton, Jr. |
| 5,154,504 | A | 10/1992 | Helal et al. |
| 5,574,423 | A | 11/1996 | Vosika et al. |
| 5,666,029 | A | 9/1997 | McDonald |
| 6,219,262 | B1 | 4/2001 | Burgyan |
| 6,285,132 | B1 | 9/2001 | Conley, III et al. |
| 6,434,023 | B2 | 8/2002 | Preller |
| 6,502,044 | B1 | 12/2002 | Lane et al. |
| 6,538,568 | B2 | 3/2003 | Conley, III |
| 6,788,000 | B2 | 9/2004 | Appelberg et al. |
| 6,897,623 | B2 | 5/2005 | Yoneda et al. |
| 7,015,654 | B1 | 3/2006 | Kuhlmann et al. |
| 7,638,948 | B2 | 12/2009 | Descarries et al. |
| 7,839,667 | B2 | 11/2010 | Liao et al. |
| 8,242,757 | B2 | 8/2012 | Huang et al. |
| 8,258,705 | B2 | 9/2012 | Butteris et al. |
| 8,686,662 | B1 | 1/2014 | Bragg et al. |
| 2001/0040798 | A1 | 11/2001 | Appelberg et al. |
| 2003/0063417 | A1 | 4/2003 | Pereira et al. |
| 2006/0139161 | A1 | 6/2006 | Beghelli |
| 2006/0170375 | A1* | 8/2006 | Okamoto ........... H05B 41/2925 315/291 |
| 2008/0068298 | A1 | 3/2008 | Shen et al. |
| 2008/0088254 | A1* | 4/2008 | Yang .................. H05B 33/0815 315/247 |
| 2011/0215728 | A1 | 9/2011 | Lenk |
| 2013/0147351 | A1 | 6/2013 | McBryde et al. |
| 2013/0342131 | A1 | 12/2013 | Recker et al. |
| 2014/0001963 | A1 | 1/2014 | Chobot et al. |
| 2014/0028196 | A1* | 1/2014 | Takikita ................. H05B 37/02 315/130 |
| 2014/0097758 | A1* | 4/2014 | Recker ............... H05B 37/0272 315/152 |
| 2014/0145635 | A1* | 5/2014 | Chu .................. H05B 33/0815 315/224 |
| 2014/0285090 | A1* | 9/2014 | Chemel ................... F21S 2/005 315/131 |
| 2014/0320011 | A1 | 10/2014 | Hegarty |

FOREIGN PATENT DOCUMENTS

| | | |
|---|---|---|
| EP | 2249458 A1 | 11/2010 |
| EP | 2542028 A1 | 2/2013 |
| WO | 2013090350 A1 | 6/2013 |
| WO | 2013111134 A1 | 8/2013 |
| WO | WO2013120893 A1 | 8/2013 |
| WO | 2013136242 A2 | 9/2013 |

* cited by examiner

EMERGENCY LIGHTING DRIVER WITH PROGRAMMABLE OUTPUT POWER

CROSS-REFERENCE TO PRIOR APPLICATIONS

This application is the U.S. National Phase application under 35 U.S.C. § 371 of International Application No. PCT/IB2015/053072, filed on Apr. 28, 2015, which claims the benefit of U.S. Patent Application No. 61/992,961, filed on May 14, 2014. These applications are hereby incorporated by reference herein.

TECHNICAL FIELD

The present invention is directed generally to a power control apparatus, such as an emergency lighting driver. More particularly, various inventive methods and apparatus disclosed herein relate to an emergency lighting driver with a programmable output power profile.

BACKGROUND

Emergency lighting has been employed for several decades, for example to provide power to one or more light sources for illumination of the path of egress from a building or facility. Emergency lighting is required in industrial, commercial, and institutional buildings as part of the safety equipment. Emergency lighting relies on a limited backup power source for example a battery, to supply power to the light source(s). Emergency lighting unit (sometimes referred to as an "emergency ballast") is designed to energize the light source(s) exclusively during periods of AC power failure, when the ballast is said to be in "emergency mode" (EM), and may be combined with a conventional lighting unit (sometimes referred to as an "AC ballast"). The emergency lighting unit may sense the absence of the AC power and use the backup power source and dedicated electronic circuitry to energize the light source(s) during a limited period of AC power failure. In the USA, the required emergency lighting period is at least 90 minutes, while in Europe, e.g., it is 180 minutes, during which the emergency illumination level should not decline to under 60% of the initial level, as set for battery-powered emergency lighting systems by the life safety codes (e.g., section 7.2 of NFPA-101 and NEC 700.12).

Recently, light-emitting diodes (LEDs) have become more prominent in the market as a main light source for an occupied space. LEDs offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. These advantages are leading to the introduction of LEDs into a wide variety of applications and context. In particular, LED light sources are now being developed for use in emergency lighting systems.

Since emergency lighting depends on a limited power source (e.g., one or more batteries), it becomes critical to have the ability to control the power supplied to the light source(s). Typically, power conversion circuits for emergency lighting implement constant voltage control or constant current control. In the approach of constant voltage control, the output power is decreased as the output impedance increases. In the approach of constant current control, the output power is increased as the output impedance increases. If the output power is controlled by simply adopting the approach of constant voltage control or the constant current control, the cost is relatively low and the circuit design is relatively uncomplicated, but the power is easily varied and optimal use is not made of the energy available by the backup power source.

For example, emergency lighting systems based on LED loads typically attempt to provide a constant current to the LED load, which, by virtue of the heat dissipated by the LED load elements, lead to a decreasing load voltage profile, "naturally" translated into a monotonically decreasing output power profile. However, this inherently leads not only to a lack of control of the gradual decrease in the output power, but also fails to conserve input energy (e.g., from one or more batteries) via a fully controlled output power profile, which is vital for an emergency lighting system that needs to comply with strict code regulations.

Thus, there is a need in the art to provide an emergency lighting driver which can provide a controlled power output profile which can meet regulatory requirements for emergency lighting levels over time, while also maximizing the use of the available energy from the backup power source, thus providing the possibility of using fewer and/or smaller batteries.

SUMMARY

The present disclosure is directed to inventive methods and apparatus for driving an emergency LED load. For example, the present disclosure describes embodiments of an emergency lighting driver with a programmable output power profile.

Generally, in one aspect, an emergency lighting driver, comprises: a power translation circuit configured to receive input power from an emergency power source and to supply output power to a load comprising one or more lighting devices; a voltage monitor configured to monitor in real time a voltage across the load and in response thereto to produce a voltage feedback signal; a current monitor configured to monitor in real time a current through the load and in response thereto to produce a current feedback signal; and a programmable control device configured to be programmed to control the power translation circuit in response to the voltage feedback signal and the current feedback signal to cause the output power supplied to the load to have a programmed power output profile, wherein the programmed power output profile is a function of at least one of: time, a temperature, a type of energy source employed for the emergency power source, an amount of remaining energy stored in the emergency power source, and an occupancy of an area in which the emergency lighting driver is located.

In one or more embodiments, the programmable control device comprises a power calculation unit configured to calculate in real time a difference between: (1) the output power supplied to the load and (2) a programmed power level that should be supplied to the load corresponding to the programmed power output profile for the emergency lighting driver, and further configured to provide a feedback signal to control the power translation circuit to supply the programmed power level to the load.

In one or more embodiments, the emergency lighting driver further comprises a user interface configured to allow a user to select a selected power output profile for the emergency lighting driver.

In some variations of these embodiments, the user interface is configured to supply an indication as to whether or not the emergency lighting driver is capable of providing the selected power output profile.

In one or more embodiments, the programmed power output profile consists of a series of monotonically decreasing constant power steps.

In one or more embodiments, the programmable control device includes a nonvolatile memory, and wherein data identifying the programmed power output profile is stored in the nonvolatile memory.

In one or more embodiments, the programmable control device includes an adaptive sampling rate power-controlled feedback voltage and/or slope generator configured to generate a feedback signal for controlling the power translation circuit in response to the voltage feedback signal and the current feedback signal.

In some variations of these embodiments, the adaptive sampling rate power-controlled feedback voltage/slope generator includes an adaptive sampling rate power-error computation element configured to determine the output power which is being supplied to the load based on the voltage feedback signal and the current feedback signal, and further configured to determine a difference between: (1) a target output power that should be supplied to the load corresponding to the programmed power output profile for the emergency lighting driver; and (2) the output power which is being supplied to the load.

In some variations of these embodiments, the programmed power output profile is characterized by a finite number of constant power steps, and wherein the adaptive sampling rate power-controlled feedback voltage/slope generator is configured to have a first, higher, sampling rate during a transition period from one of the constant power steps to another of the constant power steps, and to have a second, lower, sampling rate during a period in a middle of a constant power step.

In some embodiments, the programmed power output profile is a function of time, wherein the programmed power output profile is characterized by a finite number of constant power steps each having a corresponding time duration, wherein a first constant power step at a time when the emergency lighting driver is initially activated to provide emergency lighting has a first power level, and wherein a last step at a specified time interval after the emergency lighting driver is initially activated has a second power level which is less than the first power level and greater than zero.

In some embodiments, the power translation circuit comprises a current source for supplying a discrete-step adjusted current, in order to ultimately supply a substantially constant power to the load during each constant power step.

In some embodiments, the current source is controlled to adjust a magnitude of a step of the discrete-step adjusted current in relation to a difference between: (1) the current through the load as indicated by the current feedback signal; and (2) a target load current that should be supplied to the load corresponding to the programmed power output profile for the emergency lighting driver.

In some variations of these embodiments, the magnitude of the step decreases as the difference decreases.

In some embodiments, the power translation circuit comprises a DC-DC converter having a pulse-width modulator, and wherein the programmable control device is configured to be programmed to control the power translation circuit by controlling a duty cycle of the pulse-width modulator.

In another aspect, a programmable power control apparatus comprises: a power translation circuit configured to receive input power from an emergency power source and to supply output power to a load; a voltage monitor configured to monitor in real time a voltage supplied to the load and in response thereto to produce a voltage feedback signal; a current monitor configured to monitor in real time a current supplied to the load and in response thereto to produce a current feedback signal; and a power translation circuit control device, configured to determine in real time a difference between: the current supplied to the load, and a required current which should be supplied to the load corresponding to a programmed output power level for the programmable power control apparatus, and further configured to provide a feedback signal to control the power translation circuit to supply the programmed output power level to the load.

In some embodiments, the load comprises one or more light emitting diodes, and wherein the power translation circuit comprises a current source for supplying a discrete-step adjusted current, in order to ultimately supply a substantially constant power to the load.

In some embodiments, the power translation circuit comprises a DC-DC converter having a pulse-width modulator, and wherein the power translation circuit control device is configured to control the power translation circuit by controlling a duty cycle of the pulse-width modulator.

In some embodiments, the programmable power control apparatus further comprises a memory wherein data identifying the programmed output power level is stored in the memory.

In yet another aspect, a method of controlling power supplied to a load, the method comprises: receiving input power from an emergency power source and supplying therefrom output power to the load; monitoring in real time a voltage across the load and in response thereto producing a voltage feedback signal; monitoring in real time a current through the load and in response thereto producing a current feedback signal; and controlling a power translation circuit in response to the voltage feedback signal and the current feedback signal to cause the output power supplied to the load to have a programmed power output profile, wherein the programmed power output profile is a function of at least one of: time, a temperature, a type of energy source employed for the emergency power source, an amount of remaining energy stored in the emergency power source, and an occupancy of an area in which the emergency lighting driver is located.

In some embodiments, controlling the power translation circuit in response to voltage feedback signal and the current feedback signal comprises calculating in real time a difference between: (1) the output power supplied to the load and (2) a power level that should be supplied to the load for the programmed power output profile.

In some embodiments, the programmed power output profile is characterized by a finite number of constant power steps, further comprising sampling the output power supplied to the load at a first, higher, sampling rate during a transition period from one of the constant power steps to another of the constant power steps, and sampling the output power supplied to the load at a second, lower, sampling rate during a period in a middle of a constant power step.

In some embodiments, the method further comprises receiving from a user interface data for selecting a selected power output profile.

In some variations of these embodiments, the method further comprises supplying an indication via the user interface as to whether or not the selected power output profile is achievable.

In some embodiments, the load comprises one or more light emitting diodes, and wherein the method comprises supplying a discrete-step adjusted current, in order to ultimately supply a substantially constant power to the one or more light emitting diodes during each constant power step.

In some variations of these embodiments, the method further comprises adjusting a magnitude of a step of the discrete-step adjusted current in relation to a difference between: (1) the current through the load as indicated by the current feedback signal; and (2) a target load current that should be supplied to the load corresponding to the programmed power output profile for the emergency lighting driver.

In some variations of these embodiments, the magnitude of the step decreases as the difference decreases.

In some embodiments, the power translation circuit includes a DC-DC converter having a pulse-width modulator, and wherein controlling the power translation circuit in response to the voltage feedback signal and the current feedback signal to cause the output power supplied to the load to have the programmed power output profile comprises controlling a duty cycle of the pulse-width modulator.

In some embodiments, the programmed power output profile is a function of time, wherein the programmed power output profile is characterized by a finite number of constant power steps each having a corresponding time duration, wherein a first constant power step at a time when the emergency lighting driver is initially activated to provide emergency lighting has a first power level, and wherein a last step at a specified time interval after the emergency lighting driver is initially activated has a second power level which is less than the first power level and greater than zero.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator, and one or more devices that enable communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In existing solutions for emergency lighting lack the ability to precisely control the power consumed by the light source(s) over time, and optimal use is not made of the energy available by the backup power source (e.g., a battery).

More generally, Applicants have recognized and appreciated that it would be beneficial and that there is a need in the art to provide an emergency lighting driver which can provide a controlled power output profile which can meet regulatory requirements for emergency lighting levels over time, while also maximizing the use of the available energy from the backup power source, thus providing the possibility of using fewer and/or smaller batteries.

In view of the foregoing, various embodiments and implementations of the present invention are directed to an emergency lighting driver with a programmable output power profile.

Figure 1:
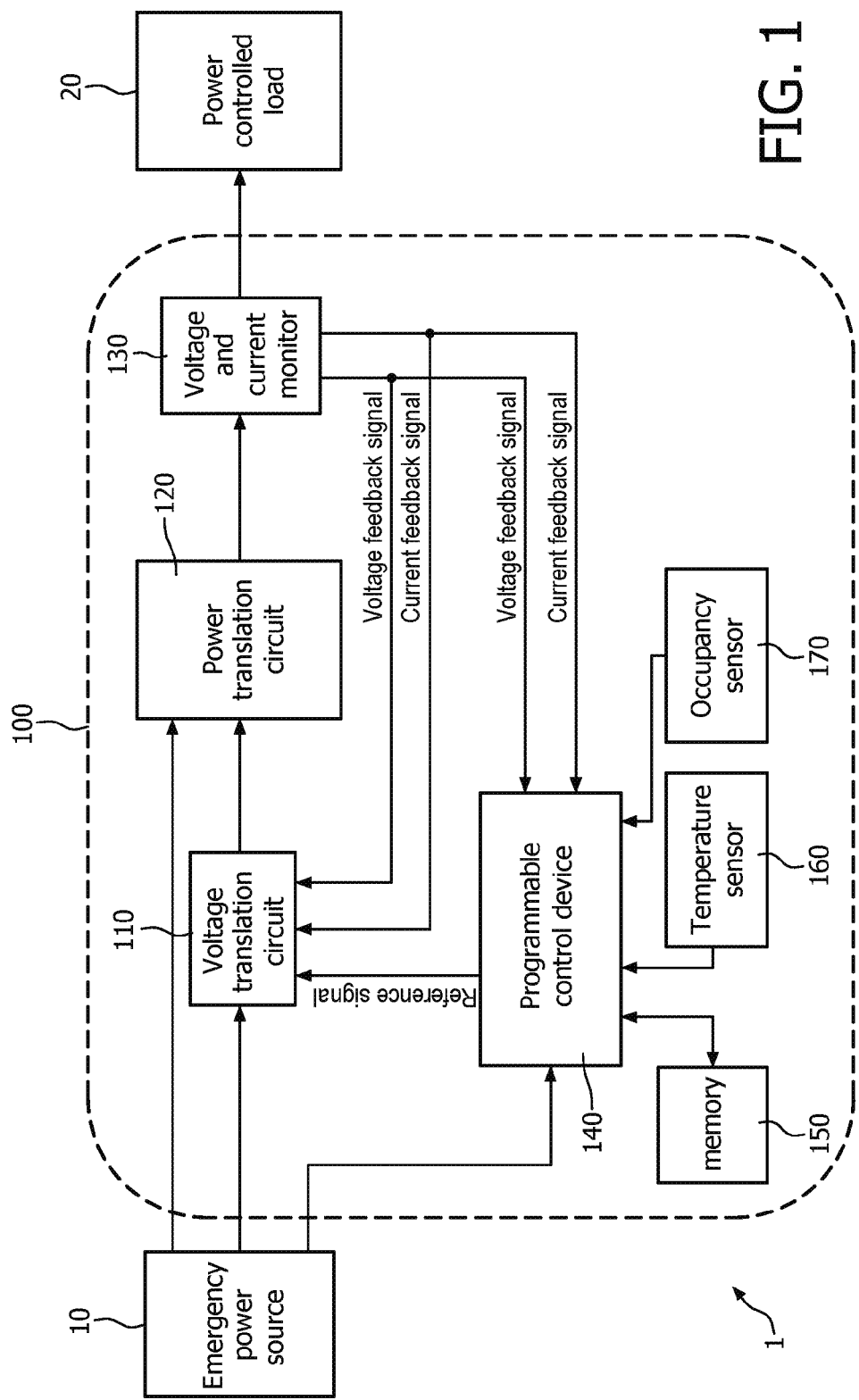
FIG. 1 illustrates one embodiment of an apparatus having a programmable power control apparatus.

FIG. 1 illustrates one embodiment of an apparatus 1 having programmable power control apparatus 100.

Apparatus 1 receives emergency input power from an emergency power source 10 (e.g., one or more batteries), and supplies output power to a power controlled load 20. In some embodiments, apparatus 1 may comprise an emergency lighting apparatus, programmable power control apparatus 100 may comprise an emergency lighting driver, and power controlled load 20 may comprise one or more lighting devices. In some embodiments, the one or more lighting devices may comprise one or more light emitting diodes (LEDs). However, in general power controlled load 20 may comprise any load where precise control of the power which is supplied to it is desired.

Programmable power control apparatus 100 comprises a voltage translation circuit 110, a power translation circuit 120, a voltage and current monitor 130, and a programmable control device 140.

In some embodiments, power translation circuit 120 comprises a pulse-width modulation (PWM) DC-to-DC converter which supplies a controlled output current to power controlled load 10. However, other embodiments may employ other types of power translation circuits and methods besides PWM.

Voltage and current monitor 130 includes a voltage monitor configured to monitor in real time the voltage across power controlled load 20, and in response thereto to produce a voltage feedback signal, and a current monitor configured to monitor in real time the current being supplied to power controlled load 20, and in response thereto to produce a current feedback signal.

In some embodiments, voltage translation circuit 110 comprises a PWM controller for controlling a duty cycle of a PWM modulator of power translation circuit 120 in response to a reference signal from programmable control device 140 and the voltage feedback signal and/or current feedback signal from voltage and current monitor 130. Again, however, other embodiments may employ other types of power translation circuits and methods besides PWM.

In some embodiments, programmable control device 140 may include a processor, in particular a microprocessor. In some embodiments, power control apparatus 100 may include one or more memory devices 150 which are accessible by a processor in programmable control device 140 and which store(s) data which identifies a programmed power output profile which is to be supplied by power translation circuit 120 to power controlled load 20. In some embodiments, memory device(s) 150 may store data indicating a programmed power output profile for the output power which is to be supplied by power translation circuit 120 to power controlled load 20 which is a function of one or more parameters, such as time, temperature, the type of energy source employed for emergency power source 10, the amount of remaining energy stored in emergency power source 10, and/or the occupancy of an area in which power control apparatus 100 (or power controlled load 20, e.g., including one or more lighting sources) is located. In some embodiments, one or more memory device 150 may be included in programmable control device 140. In some embodiments, memory device(s) 150 may include volatile memory and non-volatile memory. In that case, in some embodiments the non-volatile memory may store instructions to be executed by a processor of programmable control device 140 to transform the voltage feedback and current feedback signals to the reference signal to achieve the expected output power to match the desired power output profile.

In some embodiments, the programmed output power level which is to be supplied by power translation circuit 120 to power controlled load 20 is a value which changes with time. In some embodiments the power output profile may correspond to a series of constant power steps, each corresponding to a particular output power level. However, in general any arbitrary power output profile may be employed within the constraints of the amount of energy available from emergency power source 10.

In some embodiments, programmable control device 140 detects the output power provided by power translation circuit 120 to power controlled load 20, via the voltage feedback signal and the current feedback signal, and adjusts the output power provided by power translation circuit 120 to power controlled load 20 via a reference signal supplied to voltage translation circuit 110 so as to cause the output power provided by power translation circuit 120 to power controlled load 20 to match the programmed output power level. For example, the current feedback signal can serve as the reference value for programmable control device 140, so as to precisely control the output power supplied by power translation circuit 120 to power controlled load 10 to match a programmed output power level.

For example, in some embodiments, programmable control device 140 receives the voltage feedback signal from voltage and current monitor 130 and calculates therefrom an expected current value which would deliver the programmed output power level to power controlled load 20. In that case, programmable control device 140 also receives the current feedback signal from voltage and current monitor 130. Programmable control device 140 compares the expected current value to the current value indicated by the current feedback signal, and in response thereto outputs to power translation circuit 120 a reference signal which indicates whether the output power level should be adjusted, for example by adjusting a duty cycle of a pulse width modulator of power translation circuit 120.

If the programmed output power is constant, then programmable control device 140 provides a reference signal which is substantially constant. If the output power is to be adjusted, then programmable control device 140 provides a reference signal which is adjusted to thereby cause voltage translation circuit 110 and power translation circuit 120 to adjust the output power supplied to power controlled load 20.

When the voltage or current feedback signal is not available or within a specified range (for example, due to a load having too high or too low of an impedance), programmable power control apparatus 100 may self limit to prevent high potentials on open loads, or high currents on low impedance loads. For example, in some embodiments when improper or out of range feedback signals are detected, programmable control device 140 operates together with voltage translation circuit 110 to cause power translation circuit 120 to reduce the output power to minimum programmed levels until appropriate loads are detected.

For example, in programmable power control apparatus 100, the voltage and current reference signals are also supplied to voltage translation circuit 110. This may facilitate the ability of voltage translation circuit 110 to protect power translation circuit 120 against over-voltage or over-current conditions. Voltage translation circuit 110 may be set with inherent limits to protect against improper loading. In that case, when the impedance of power controlled load 20 is detected to be less than a lowest specified impedance, programmable control device 140 may operate with voltage translation circuit 110 to limit the output current from power translation circuit 120 to a set maximum value. When the impedance of power controlled load 20 is reduced to near zero, programmable control device 140 may reduce the output current from power translation circuit 120 to a minimum programmed operational output. Conversely, when the impedance of power controlled load 20 is detected to be greater than a maximum specified impedance, programmable control device 140 may operate with voltage translation circuit 110 to limit the output voltage from power translation circuit 120 to a set maximum value.

As indicated above, in some embodiments, power control apparatus 100 may be programmed to provide a power output profile for the output power which is to be supplied by power translation circuit 120 to power controlled load 20 which is a function of one or more parameters, such as time, temperature, the type of energy source employed for emergency power source 10, the amount of remaining energy stored in emergency power source 10, and the occupancy of an area in which power control apparatus 100 (or power controlled load 20) is located.

Toward that end, as shown in FIG. 1, in some embodiments power control apparatus 100 may include one or more temperature sensors 160 and/or occupancy sensors 170. Furthermore, in some embodiments emergency power source may provide one or more signals to programmable control device 140 as illustrated in FIG. 1 and described below. It should be understood that in other embodiments, temperature sensor(s) 160 and/or occupancy sensor(s) 170 may be omitted from power control apparatus 100. In other embodiments, power control apparatus 100 may receive one or more signals from one or more temperature sensor(s) and/or occupancy sensor(s) which are external to power control apparatus 100, and process those signals in the same or similar way to the way it processes signals from temperature sensor(s) 160 and/or occupancy sensor(s) 170, as discussed below. Indeed, in general it should be understood that, for convenience of illustration, a dashed box is shown enclosing components of the particular embodiment of power control apparatus 100 illustrated in FIG. 1, in other embodiments of a power control apparatus one or more of the specific components shown in the dashed box may be provided external to the power control apparatus, or may be omitted.

In some embodiments, programmable control device 140 receives a temperature reference value from temperature sensor 160 and transforms the expected reference signal based on the programmed power. That is, based on the temperature reference value received from temperature sensor 160, programmable control device 140 may modify the reference signal which it provides to voltage translation circuit 110 to cause power translation circuit 120 to reduce, raise, or not change the output power which it supplies to load 20. For example, if the temperature is above a predetermined limit, programmable control device 140 can reduce the output power to reduce the stress on the system as a whole. Also, programmable control device 140 can adjust the output power supplied to load 20 based on the rate of change of temperature.

In some embodiments, programmable control device 140 may receive an occupancy reference value from occupancy sensor 170 which may depend on whether or not a particular area or room, for example an area or room where load 20 (e.g., one or more lighting devices) is located, and transforms the expected reference signal based on the programmed power profile. That is, based on the occupancy reference value from occupancy sensor 170, programmable control device 140 may modify the reference signal which it supplies to voltage translation circuit 110 to cause power translation circuit 120 to reduce, raise, or not change the output power which it supplies to load 20. For example, if an area needed to be lit by one or more lighting devices of load 20 in an emergency situation is not occupied by anyone, then programmable control device 140 can reduce the output power supplied to 20 to conserve the energy stored in emergency power source 10 until the area is occupied.

In some embodiments, programmable control device 140 may receive one or more signals from emergency power source 10 that describe(s) the emergency power source type and amount of energy available. If the available energy remaining is low, then programmable control device 140 may modify the reference signal which it supplies to voltage translation circuit 110 to cause power translation circuit 120 to reduce the output power to the load. Thus power control apparatus 100 can either follow a predetermined power profile or dynamically adjust the output power profile over time. This can in effect conserve energy from emergency power source 10 and thus extend emergency operation duration.

Figure 2:
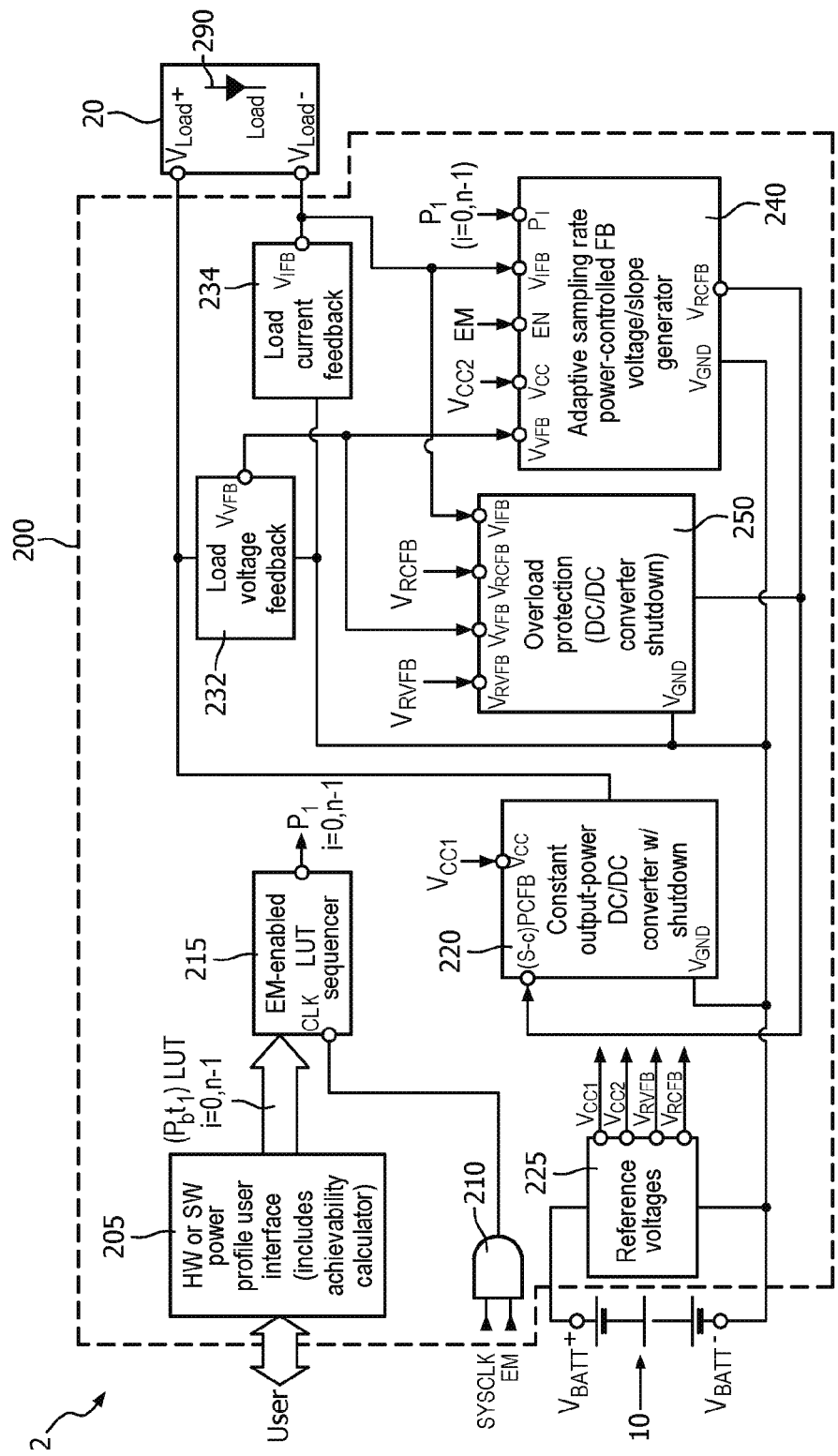
FIG. 2 illustrates an embodiment of an emergency lighting apparatus having an emergency lighting driver with a programmable power profile.

FIG. 2 illustrates an embodiment of an emergency lighting apparatus 2 having an emergency lighting driver 200 with a programmable power profile. Emergency lighting driver 200 may be one embodiment of programmable power control apparatus 100.

Emergency lighting apparatus 2 receives emergency input power from an emergency power source 10 (e.g., one or more batteries), and supplies output power to a load 20. Load 20 may comprise one or more lighting devices. In some embodiments, the one or more lighting devices may comprise one or more light emitting diodes (LEDs) 290. However, in general load 20 may comprise any load where programmable control of the power which is supplied to it as a function of: time, temperature, the type of energy source employed for emergency power source 10, the amount of remaining energy stored in emergency power source 10, and/or the occupancy of an area in which programmable power control apparatus 100 and/or load 10 is located, is desired.

Emergency lighting driver 200 comprises a user interface 205, a logic device 210, an emergency mode (EM)-enabled look-up table sequencer 215, a constant output-power DC/DC converter 220 with shutdown capability, a reference voltage generator 225, a load voltage monitor 232, a load current monitor 234, an adaptive sampling rate power-controlled feedback voltage and/or slope generator 240, and an overload protection circuit 250.

Reference voltage generator 225 receives a voltage from emergency power source 10 (e.g., one or more batteries) and produces one or more regulated output voltages which may be employed by various circuits in emergency lighting driver 200.

Constant output-power DC/DC converter 220 functions as a power translation circuit configured to receive input power from emergency power source (e.g., battery/batteries 10) and to supply output power to load 20 under control of a feedback signal from adaptive sampling rate power-controlled feedback voltage and/or slope generator 240.

In particular, as will be described in greater detail below, emergency lighting driver 200 may be programmable to control constant output-power DC/DC converter 220 in response to a voltage feedback signal and a current feedback signal to cause the output power supplied to load 20 to have a programmable power output profile, for example as a function of time. In some embodiments, the power output profile may be characterized by a finite number of constant power steps each having a corresponding time duration. For example, in some embodiments constant output-power DC/DC converter 220 may comprise a current source for supplying a discrete-step adjusted current to load 20 (e.g., one or more LEDs 290), in order to ultimately supply a substantially constant power to load 20 during each of a plurality of constant power steps. In some embodiments, the first constant power step at a time when emergency lighting driver 200 is initially activated to provide emergency lighting (e.g., in response to a loss of AC Mains power) may have a first power level, and a last step at a specified time interval (e.g., 60 minutes or 90 minutes) after the emergency lighting driver is initially activated has a second power level which is less than the first power level and greater than zero. In some embodiments, the second power level may be a specified percentage of the initial power level of the first step, which may be set to meet regulatory requirements for emergency lighting in a particular jurisdiction. For example, in the United States the current requirement is for emergency lighting apparatus 2 to provide at least 60% of the initial lighting level for a required minimum emergency lighting period of at least 90 minutes. In Europe, the required minimum emergency lighting period is 180 minutes.

Figure 3:
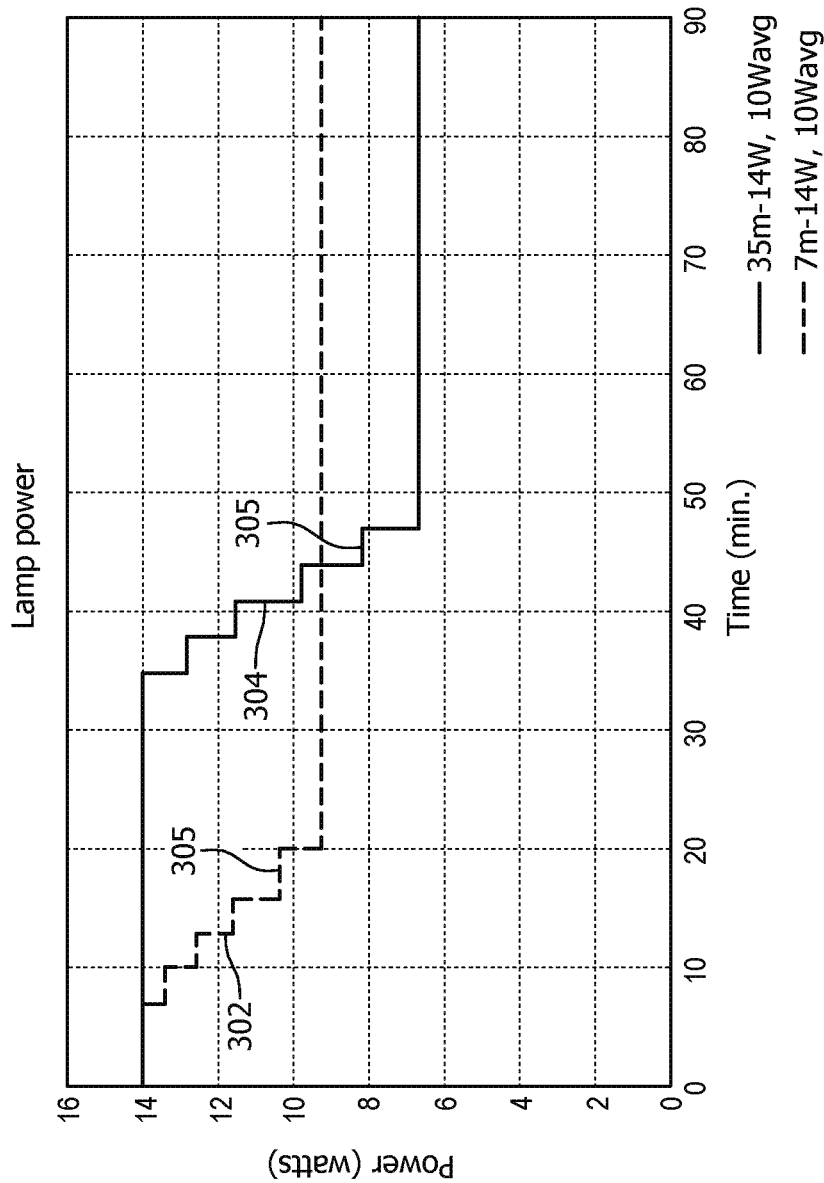
FIG. 3 illustrates two examples of power output profiles of an emergency lighting driver with a programmable power profile.

FIG. 3 illustrates two example power output profiles 302 and 304 for an emergency lighting driver having a programmable power profile, for example emergency lighting driver 200 of FIG. 2. Each of the power output profiles 302 and 304 comprises a finite number of constant power steps 305 each having a corresponding time duration, wherein the first constant power step 3005 at the time when emergency lighting driver 200 is initially activated (e.g., in response to a loss of AC Mains power) to provide emergency lighting (t=0) has a first power level, and wherein a last step 305 at a specified time interval (e.g., t=90 minutes) after emergency lighting driver 200 is initially activated has a second power level which is less than the first power level and greater than zero. Here, a constant power step refers to a time interval during which the output power is adjusted to, and then maintained at, a corresponding constant power level. The constant power levels of the constant power steps may all be different from each other.

It should be noted that the average power supplied to the load (e.g., load 20, which may include one or more lighting sources) by each power output profile over a time period of 90 minutes is the same (10 watts) for each of the exemplary power output profiles 302 and 304, but the way in which the power decreases over time is quite different for the two profiles. In particular, in power output profile 302 the power decreases in a series of steps over the first 20 minutes, and then maintains an output power level at about 56.1% of the initial power level for the final 70 minutes. In contrast, power output profile 304 takes a different approach wherein the output power is maintained at the initial power level for a more extended period of time of 35 minutes, and then decreases relatively quickly over the next 12 minutes to be 47.1% of the initial power level for the final 43 minutes. When power output profile 302 is employed to drive an LED load (e.g., including one or more LEDs 290), the illumination level of the LEDs will decrease from the maximum brightness of time t=0 relatively quickly, but a higher minimum level of illumination will be provided over the 90 minute duration compared to power output profile 304. In contrast, when power output profile 304 is employed to drive the LED load, the illumination level of the LEDs remains at the maximum brightness of time t=0 for a relatively longer time, but the minimum level of illumination over the 90 minute duration will be lower compared to power output profile 302.

It should be understood that in general emergency lighting driver 200 may support a large number of different power output profiles. Although in many contexts it may be desirable to have a monotonically decreasing series of constant power steps 305 as in power output profiles 302 and 304, in general this is not required. That is, in some embodiments the power output profile may have some constant power steps that are increasing as a function of time. However by employing a power profile comprising a series of decreasing steps, in some embodiments emergency lighting apparatus 2 may operate to meet specified illumination requirements with an emergency power source 10 which has fewer and/or smaller batteries than may be required for an emergency ballast that may attempt to maintain either a constant light output for the entire required minimum emergency lighting period, or which attempts to follow a "natural" (monotonically decreasing) output power profile based on supplying a constant current to the lighting devices over time.

Accordingly, in some embodiments an operator, programmer, or user of emergency lighting driver 200 may select a desired power output profile via user interface 205. The selected power output profile may then be translated into a series of values Pi (=0, n−1) for each constant power step (0, n−1) which may be stored in a look-up table (LUT) in a memory device of emergency lighting driver 200 via look-up table sequencer 215. That is, a programmed dynamic power output profile may be stored in a memory device of emergency lighting driver 200.

The dynamic power output profile may be defined by the user in a variety of ways, but in various embodiments some or all of the following parameters may be provided by the user or operator: • required average power, possibly as an interval (Pavg_min, Pavg_max); • individual durations summing up to the total required minimum emergency lighting period (defaulting to 90 minutes, according to US regulations); • initial power ($P_0$) together with the rest of "power step floors" ($P_1$ to $P_{n-1}$), or the "step heights" Pi; • the maximum power step value Pmax (for example, if software in user interface 205 is to compute the power levels that will achieve the desired average power)—in some embodiments, this value may have an upper bound which corresponds to the minimum power step that allows the human eye to discern a change in an illumination level provided by load 20; • the minimum output power during required minimum emergency lighting period (which may be limited to no less than 60% of $P_0$, according to US regulations).

It is apparent, there will be an upper bound for the total energy which may be defined by a user selected power output profile, as the total energy provided by constant output-power DC/DC converter 220 for any power output profile is limited by the amount of stored energy available from emergency power source 10 (e.g., one or more batteries), and may be further reduced by the power conversion efficiency of constant output-power DC/DC converter 220. For example, in some embodiments it would not be possible to have a power output profile with 100% power over the entire required minimum emergency lighting period of emergency lighting driver 200.

Accordingly, in some embodiments emergency lighting driver 200 may verify the achievability of the power output profile selected by a user and operator, and then implement the selected power output profile if it is deemed achievable. As an example, a certain average power (computed over 90 minutes in the USA, as already illustrated in FIG. 3) may be impossible to be achieved with the initial and end "step floor" powers in combination with the time step chosen by the user, or may violate regulatory requirements. In that case, user interface 205 may communicate to the user an indication as to whether or not emergency lighting driver 200 is capable of providing the selected power output profile. In some embodiments, user interface 205 may suggest or recommend to the user an alternative power output profile which is achievable.

In some embodiments, user interface 205 may comprise a bidirectional interface driven by a dedicated piece of software. In this case the interface software may also handle the achievability aspect of the desired power output profile, most often from the regulatory code perspective of reconciling an initial power level with the final level (i.e., at the 90 minute mark) not falling under 60% of the initial power level (under the pretty accurate assumption that the light output closely follows the power driving the lamp load), and also with the possible application-required average power level. Hence, in general, it is user interface 205 which defines the power levels of the constant power steps, as well as their durations, which then may be presented to emergency lighting driver 200 in the simple form of a look-up table (LUT), easy to follow during a power outage, in emergency mode. In that case, logic circuit 210 may receive an emergency mode (EM) signal and a system clock and produce therefrom a gated clock which is supplied to EM-enabled LUT sequencer 215 to cause EM-enabled LUT sequencer 215 to cycle its output through the constant power steps of the selected power output profile. However, it should be understood that other embodiments are possible. For example, in its most simple form, user interface 205 can be substituted by a piece of code (the LUT itself) that is part of the unit's firmware. Furthermore, in some embodiments a look up table may not be employed. For example, a processor (e.g., part of user interface 205) may calculate the constant power step values from data supplied by a user to define a desired power output profile.

A description will now be provided as to how emergency lighting driver 200 may provide power to load 20 according to a selected power output profile, such as may be received via user interface 205 as described above.

Turning again to FIG. 2, load voltage monitor 232 monitors in real time the voltage supplied by constant output-power DC/DC converter 220 to load 20 and in response thereto generates a voltage feedback signal $V_{VFB}$, and load current monitor 234 monitors in real time the current supplied by constant output-power DC/DC converter 220 to load 20 and in response thereto generates a current feedback signal $V_{IFB}$. In some embodiments, one or more of voltage monitor 232 and current monitor 234 may include a filter, e.g., a low pass filter, to filter out any high switching frequency component riding on the voltage and current supplied to load 20 by constant output-power DC/DC converter 220.

Overload protection circuit 250 receives the current feedback signal $V_{IFB}$ and the voltage feedback signal $V_{VFB}$ and, further receives and a reference voltage feedback voltage $V_{RVFB}$ and a reference current feedback voltage $V_{RCFB}$ from reference voltage generator 225. Overload protection circuit 250 is configured to shutdown constant output-power DC/DC converter 220 in the event that the output current or output voltage is too high, for example due to a problem with load 20 where the impedance is too high (e.g., due to an open circuit) or too low (e.g., due to a short circuit).

Adaptive sampling rate power-controlled feedback voltage and slope generator 240 receives the current feedback signal and the voltage feedback signal and a programmed power level Pi, for example the power level of a current constant power step of a programmed power output profile. Adaptive sampling rate power-controlled feedback voltage and/or slope generator 240 includes a power calculation unit configured to calculate in real time a difference between: (1) the output power supplied to the load and (2) a programmed power level Pi that should be supplied to load 20 corresponding to a programmed power output profile for emergency lighting driver 200 as a function of time, and is further configured to provide a power control feedback signal $V_{PCFB}$ to control constant output-power DC/DC converter 220 to supply the programmed power level Pi to load 20. Adaptive sampling rate power-controlled feedback voltage and/or slope generator 240 may dynamically adjust the output converter control slope quantization step and/or the output profile sampling rate (i.e., the latter can be slower during each constant power step after the specific power level has been acquired and locked). More specifically, in some embodiments, adaptive sampling rate power-controlled feedback voltage and/or slope generator 240 may determine when emergency lighting driver 200 is operating at a transition between adjacent constant power steps and when it is operating within a constant power step. In that case, emergency lighting driver 200 may increase the rate of sampling of the output power to a maximum rate once a power step transition occurs so as to more quickly transition to the new power level, and may decrease the power sampling rate when operating after emergency lighting driver 200 has "settled" to the next constant power step level and is therefore operating "within" a constant power step, as described in greater detail with respect to FIG. 6 below. This may provide for: computational-resource and energy savings and a variable step converter control slope quantization. Furthermore, rapid output power shutdown for voltage and/or current overload conditions may be provided by overload protection circuit 250.

Moreover, in some embodiments, the magnitude of the discrete-step adjusted current which constant output-power DC/DC converter 220 supplies to load 20 may be varied in relation to the difference between the current supplied to load 20 as indicated by the current feedback signal $V_{IFB}$ from load current monitor 234; and (2) a target load current that should be supplied to load 20 corresponding to the programmed power output profile for emergency lighting driver 200. That is, the sequential current-steps may have a higher magnitude in an acquisition (raw adjustment) stage, and become finer as the output current supplied to load 20 approaches the target current for a given constant power step, thus allowing the potential acceleration of the time necessary to achieve the targeted constant power during each output profile step. Also, it should be mentioned that the above current-step control can be achieved via variation of the slope of the control signal $V_{PCFB}$ output by adaptive sampling rate power-controlled feedback voltage and slope generator 240 if the control is achieved via slope-control rather than voltage level control.

Figure 4:
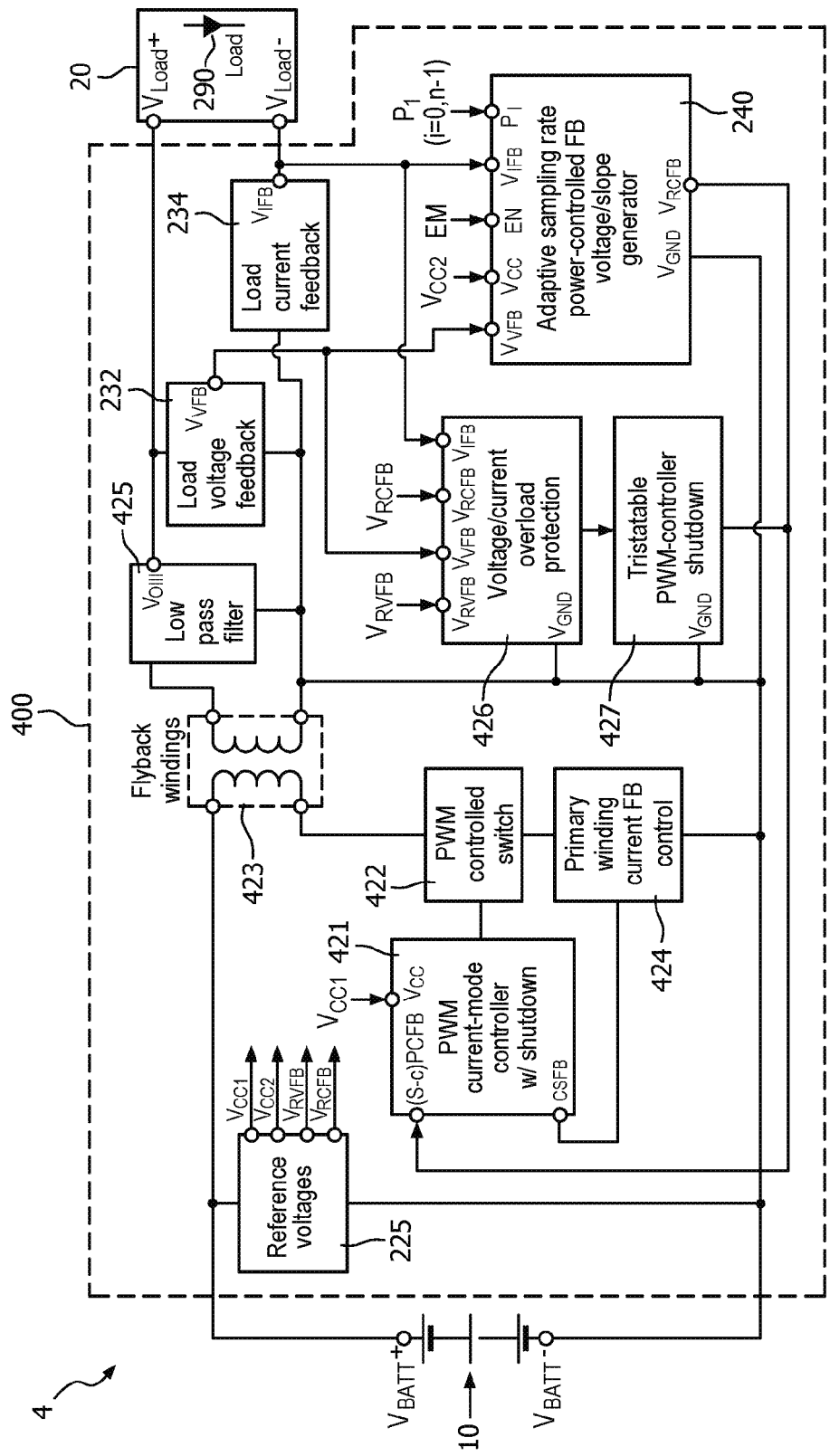
FIG. 4 illustrates an example embodiment of an emergency lighting apparatus having an emergency lighting driver with a programmable power profile and which includes an exemplary embodiment of a flyback output converter and associated feedback loops

FIG. 4 illustrates an example embodiment of an emergency lighting apparatus 4 having an emergency lighting driver 400 with a programmable power profile and which includes an exemplary embodiment of a flyback output converter and associated feedback loops. Emergency lighting driver 400 may be one embodiment of programmable power control apparatus 100.

Emergency lighting driver 400 includes reference voltage generator 225, load voltage monitor 232, load current monitor 234, adaptive sampling rate power-controlled feedback voltage and/or slope generator 240, a pulse-width modulated (PWM) current mode controller 421 with shutdown capability; a PWM controlled switch 422, a flyback transformer 423, a primary winding current feedback controller 424, a low pass filter 425, a voltage/current overload protection circuit 426 and a tristatable PWM controller shutdown circuit 427. Although not illustrated in FIG. 4, emergency lighting driver 400 may also include user interface 205, logic circuit 210, and EM-enabled LUT sequencer 215 of emergency lighting driver 200 shown in FIG. 2.

Like numbered elements in FIG. 2 and FIG. 4 may be the same, and so a description thereof is not repeated.

PWM controlled switch 422, flyback transformer 423, primary winding current feedback controller 424, and low pass filter 425 are typical components of a PWM-based DC/DC power converter for supplying a current to a load (in particular, an LED load including one or more LEDs 290), and a description thereof will therefore be omitted.

Voltage/current overload protection circuit 426 receives the voltage feedback signal $V_{VFB}$ from load voltage monitor 232 and the current feedback signal $V_{IFB}$ from load current monitor 234, and a reference voltage feedback voltage $V_{RVFB}$ and a reference current feedback voltage $V_{RCFB}$ from reference voltage generator 225, and determines therefrom when the output voltage or output current supplied to load 20 exceeds a specified reference value, for example due to a problem with load 20 having an impedance which is too high (e.g., open circuit) or too low (e.g., short circuited). When the maximum current or maximum voltage is exceeded, then voltage/current overload protection circuit 426 outputs a control signal to tristatable PWM controller shutdown circuit 427 which, e.g., pulls down the feedback signal to pulse-width modulated (PWM) current mode controller 421 and thereby shuts down the operation of PWM current mode controller 421.

Figure 5:
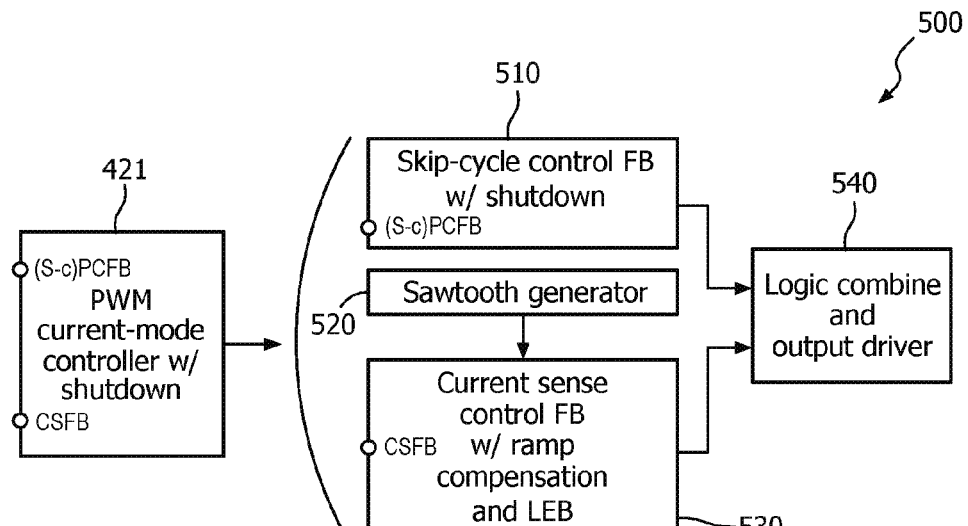
FIG. 5 illustrates a detailed lower level diagram of an exemplary embodiment of a pulse width modulated (PWM) current mode controller with shutdown.

FIG. 5 illustrates a detailed lower level diagram of an exemplary embodiment of a pulse width modulated (PWM) current mode controller 500 with shutdown capability, which may be one embodiment of PWM current mode controller 421.

PWM current mode controller 500 includes a skip-cycle control feedback circuit 510 with shut down capability, a sawtooth generator 520, a current sense control feedback controller 530 with ramp compensation and leading edge blanking (LEB), and a logic combiner and output driver 540. Ramp compensation may be used in order to prevent subharmonic oscillations in continuous conduction mode designs, while leading edge blanking is employed because of possible current spikes at the turn on of PWM-controlled (e.g., MOSFET) switch 422 when current mode control is used and where the switch current is monitored.

Figure 6:
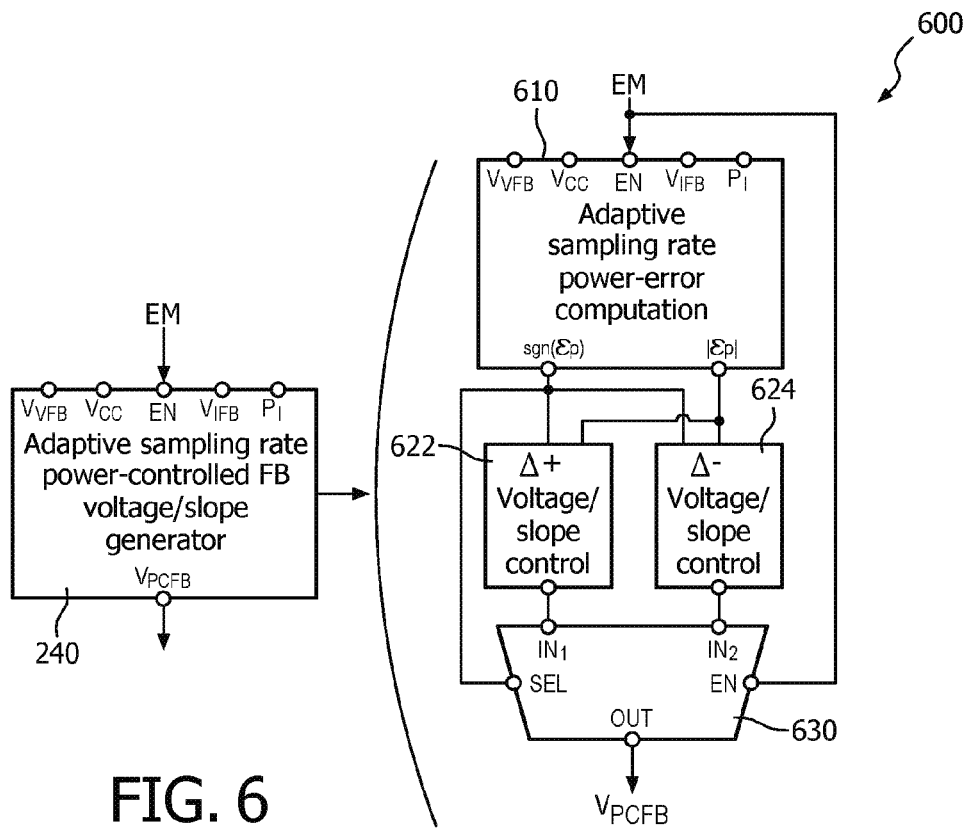
FIG. 6 illustrates a detailed lower level diagram of an exemplary embodiment of an adaptive sampling rate power controlled feedback voltage/slope generator.

FIG. 6 illustrates a detailed lower level diagram of an exemplary embodiment of an adaptive sampling rate power controlled feedback voltage/slope generator 600, which may be one embodiment of adaptive sampling rate power-controlled feedback voltage and slope generator 240.

Adaptive sampling rate power-controlled feedback voltage and slope generator 600 includes an adaptive sampling rate power error calculation unit 610, first and second voltage/slope control circuits 622 and 624, and a multiplexer 630.

The variable (adaptive) sampling rate feature of adaptive sampling rate power error calculation unit 610 has been mentioned above: namely the slowing down of the sampling once the constant power level Pi for a particular constant power step has been acquired and locked during each interval i.

The computation of the power-error at any given time is made by comparing the programmed power level Pi for the constant power step for the current time interval i (for example as received from EM-enabled LUT sequencer 215) with the actual output power being delivered to load 20 as computed by multiplying in real-time the voltage across load 20 as determined from voltage feedback signal $V_{VFB}$ and the current through load 20 as determined from current feedback signal $V_{IFB}$. This error may be computed as amplitude and sign ("sgn" in FIG. 6). Beneficially, the multiplication may be performed by a dedicated device, either in hardware or software (in the latter case, by possibly using a microprocessor). The amplitude of the power-error may determine the size of the possibly variable slope control quantization step (which may be constant in a simplified implementation), while the sign may determine whether the level of the power control feedback ($V_{PCFB}$) signal is to be increased or decreased. It should be noted that in some embodiments, load current monitor 234 or adaptive sampling rate power error calculation unit 610 may include a low pass filter that filters out the frequency (e.g., 100 kHz) of a PWM switching signal which may be riding on the output current, thus effectively averaging the load current over a very short time interval (alternately, or in addition, the power computation unit—e.g., a microcontroller—may sometime compute the average of multiple samples, typically over time intervals up to milliseconds).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An emergency lighting driver, comprising:
   a power translation circuit configured to receive input power from an emergency power source (10) and to supply output power to a load comprising one or more lighting devices;
   a voltage monitor configured to monitor in real time a voltage across the load and in response thereto to produce a voltage feedback signal;
   a current monitor configured to monitor in real time a current through the load and in response thereto to produce a current feedback signal;
   a programmable control device configured to be programmed to control the power translation circuit in response to the voltage feedback signal and the current feedback signal to cause the output power supplied to the load to have a programmed power output profile, wherein the programmed power output profile is a function of at least one of: time, a temperature, a type of energy source employed for the emergency power source, an amount of remaining energy stored in the emergency power source, and an occupancy of an area in which the emergency lighting driver is located;
   wherein the programmable control device includes an adaptive sampling rate power-controlled feedback voltage and/or slope generator configured to generate a feedback signal for controlling the power translation circuit in response to the voltage feedback signal and the current feedback signal; and
   wherein the adaptive sampling rate power-controlled feedback voltage/slope generator includes an adaptive sampling rate power-error computation element configured to determine the output power which is being supplied to the load based on the voltage feedback signal and the current feedback signal, and further configured to determine a difference between: (1) a target output power that should be supplied to the load corresponding to the programmed power output profile for the emergency lighting driver; and (2) the output power which is being supplied to the load.

2. The emergency lighting driver of claim 1, wherein the programmable control device comprises a power calculation unit configured to calculate in real time a difference between: (1) the output power supplied to the load and (2) a programmed power level that should be supplied to the load corresponding to the programmed power output profile for the emergency lighting driver, and further configured to provide a feedback signal to control the power translation circuit to supply the programmed power level to the load.

3. The emergency lighting driver of claim 1, further comprising a user interface configured to allow a user to select a selected power output profile for the emergency lighting driver, wherein the user interface is configured to supply an indication as to whether or not the emergency lighting driver is capable of providing the selected power output profile.

4. The emergency lighting driver of claim 1, wherein the programmed power output profile consists of a series of monotonically decreasing constant power steps.

5. The emergency lighting driver of claim 1, wherein the programmable control device includes a nonvolatile memory, and wherein data identifying the programmed power output profile is stored in the nonvolatile memory.

6. The emergency lighting driver of claim 1, wherein the programmed power output profile is characterized by a finite number of constant power steps, and wherein the adaptive sampling rate power-controlled feedback voltage/slope generator is configured to have a first, higher, sampling rate during a transition period from one of the constant power steps to another of the constant power steps, and to have a second, lower, sampling rate during a period in a middle of a constant power step.

7. A method of controlling power supplied to a load, the method comprising:
   receiving input power from an emergency power source and supplying therefrom output power to the load;
   monitoring in real time a voltage across the load and in response thereto producing a voltage feedback signal;
   monitoring in real time a current through the load and in response thereto producing a current feedback signal;
   controlling a power translation circuit in response to the voltage feedback signal and the current feedback signal to cause the output power supplied to the load to have a programmed power output profile, wherein the programmed power output profile is a function of at least one of: time, a temperature, a type of energy source employed for the emergency power source, an amount of remaining energy stored in the emergency power source, and an occupancy of an area in which the emergency lighting driver is located,
   wherein the programmable control device includes an adaptive sampling rate power-controlled feedback voltage and/or slope generator configured to generate a feedback signal for controlling the power translation circuit in response to the voltage feedback signal and the current feedback signal, and
   wherein the adaptive sampling rate power-controlled feedback voltage and/or slope generator includes an adaptive sampling rate power-error computation element configured to determine the output power which is being supplied to the load based on the voltage feedback signal and the current feedback signal, and further configured to determine a difference between: (1) a target output power that should be supplied to the load corresponding to the programmed power output profile for the emergency lighting driver, and (2) the output power which is being supplied to the load.

8. The method of claim 7, wherein controlling the power translation circuit in response to voltage feedback signal and the current feedback signal comprises calculating in real time a difference between: (1) the output power supplied to the load and (2) a power level that should be supplied to the load for the programmed power output profile.

9. The method of claim 7, wherein the programmed power output profile is characterized by a finite number of constant power steps, further comprising sampling the output power supplied to the load at a first, higher, sampling rate during a transition period from one of the constant power steps to another of the constant power steps, and sampling the output power supplied to the load at a second, lower, sampling rate during a period in a middle of a constant power step.

10. The method of claim 7, further comprising receiving from a user interface data for selecting a selected power output profile.

11. The method of claim 10, further comprising supplying an indication via the user interface as to whether or not the selected power output profile is achievable.

12. The method of claim 7, wherein the load comprises one or more light emitting diodes, and wherein the method comprises supplying a discrete-step adjusted current, in order to ultimately supply a substantially constant power to the one or more light emitting diodes during each constant power step.

13. The method of claim 12, further comprising adjusting a magnitude of a step of the discrete-step adjusted current in relation to a difference between: (1) the current through the load as indicated by the current feedback signal; and (2) a target load current that should be supplied to the load corresponding to the programmed power output profile for the emergency lighting driver.

* * * * *